(12) United States Patent
Burckhard et al.

(10) Patent No.: US 11,890,926 B2
(45) Date of Patent: Feb. 6, 2024

(54) AUXILIARY FUELING SYSTEM FOR TRAILER MOUNTED ENGINES

(71) Applicant: Freedom Fuels USA, Inc., Casper, WY (US)

(72) Inventors: Joseph Burckhard, Casper, WY (US); Robert Goss, Casper, WY (US)

(73) Assignee: Freedom Fuels USA, Inc., Casper, WY (US)

( * ) Notice: Subject to any disclaimer, the term of this patent is extended or adjusted under 35 U.S.C. 154(b) by 248 days.

(21) Appl. No.: 17/523,427

(22) Filed: Nov. 10, 2021

(65) Prior Publication Data
US 2022/0144080 A1 May 12, 2022

Related U.S. Application Data

(60) Provisional application No. 63/112,045, filed on Nov. 10, 2020.

(51) Int. Cl.
| | | |
|---|---|---|
| *B60K 15/07* | (2006.01) | |
| *B60K 15/03* | (2006.01) | |
| *B60D 1/62* | (2006.01) | |
| *B62D 59/04* | (2006.01) | |
| *B60K 15/063* | (2006.01) | |

(52) U.S. Cl.
CPC ............... *B60K 15/07* (2013.01); *B60D 1/62* (2013.01); *B60K 15/03006* (2013.01); *B62D 59/04* (2013.01); *B60K 2015/0638* (2013.01)

(58) Field of Classification Search
CPC .... B60D 1/62; B60K 15/07; B60K 15/03006; B62D 59/04
See application file for complete search history.

(56) References Cited

U.S. PATENT DOCUMENTS

| | | | | |
|---|---|---|---|---|
| 3,136,507 | A | * 6/1964 | Erlanger | B64D 37/20 |
| | | | | 244/135 B |
| 2006/0169639 | A1 | * 8/2006 | Duraiswamy | C10G 31/11 |
| | | | | 210/182 |
| 2007/0012184 | A1 | * 1/2007 | Duraiswamy | H01M 8/0675 |
| | | | | 95/54 |
| 2012/0193153 | A1 | * 8/2012 | Wellborn | B60W 10/08 |
| | | | | 180/14.2 |
| 2012/0193154 | A1 | * 8/2012 | Wellborn | B60W 10/04 |
| | | | | 180/14.2 |
| 2012/0325355 | A1 | * 12/2012 | Docheff | F02M 37/08 |
| | | | | 137/899 |
| 2020/0148519 | A1 | * 5/2020 | Tomimoto | B60L 1/003 |
| 2020/0231303 | A1 | * 7/2020 | Fujimori | B25J 5/00 |
| 2020/0247234 | A1 | * 8/2020 | Sawada | B62D 21/152 |
| 2020/0274375 | A1 | * 8/2020 | Griffiths | B60R 16/033 |
| 2020/0291609 | A1 | * 9/2020 | Tevis | B62D 9/04 |
| 2021/0101473 | A1 | * 4/2021 | Kondo | B60K 15/01 |

\* cited by examiner

*Primary Examiner* — Kevin R Barss
(74) *Attorney, Agent, or Firm* — Burris Law, PLLC (57) ABSTRACT

An auxiliary fueling system for filling fuel tanks disposed on a trailer is provided, which includes a fuel cell, a mounting apparatus mounted to a tractor hooked to the trailer for supporting the fuel cell thereon, and a fuel line for connecting the fuel cell to the fuel tanks on the trailer.

20 Claims, 11 Drawing Sheets

AUXILIARY FUELING SYSTEM FOR TRAILER MOUNTED ENGINES

CROSS-REFERENCE TO RELATED APPLICATIONS

This application claims priority to and the benefit of U.S. Provisional Patent Application No. 63/112,045, filed on Nov. 10, 2020. The disclosure of the above application is incorporated herein by reference.

FIELD

The present disclosure relates to fueling systems, and more particularly to fueling systems for trailer mounted engines.

BACKGROUND

The statements in this section merely provide background information related to the present disclosure and may not constitute prior art.

Hydraulic fracturing is a process of fracturing rock by injecting a pressurized liquid. A high-pressure fracking fluid is injected into a wellbore to create cracks in the deep-rock formations through which natural gas, petroleum, and brine will flow more freely. Hydraulic fracturing requires several large engines which are typically mounted on a trailer to drive pumps that inject the pressurized liquid. The engines are very complex and powerful and can present hazards to personnel that are working near the engines when the engines are running. Typically, the engines have to be stopped during fueling, causing downtime in the hydraulic fracturing operation.

The above-mentioned issues are addressed by the present disclosure.

SUMMARY

This section provides a general summary of the disclosure and is not a comprehensive disclosure of its full scope or all of its features.

An auxiliary fueling system for filling fuel tanks disposed on a trailer is provided, which includes a fuel cell, a mounting apparatus mounted to a tractor hooked to the trailer for supporting the fuel cell thereon, and a fuel line for connecting the fuel cell to the fuel tanks on the trailer.

In variations of this auxiliary fueling system, which may be implemented individually or in any combination: the fuel line is connected to an equalizing line disposed between the fuel tanks; a quick connect for connecting the fuel line to the equalizing line is provided; the quick connect is a T-fitting; the mounting apparatus comprises a frame for supporting the fuel cell thereon, and a connecting device for connecting the frame to the tractor; the connecting device is pivotable between a retracted state and an expanded state; the connecting device includes a horizontal beam and a side support disposed at each side of the horizontal beam; the side supports maintain the horizontal beam to extend along a longitudinal axis of the tractor when the connecting device is in an expanded state; the connecting device further includes a flange extending from the horizontal beam, the side supports being connected to the flange; the mounting apparatus is connected to tow pins secured to a front end of the tractor; and a height adjusting means for adjusting a height of the fuel cell is provided, which in one form is a forklift stand.

In another form of the present disclosure a method of filling fuel tanks disposed on a trailer is provided, which includes hooking a tractor to the trailer, attaching a mounting apparatus to the tractor, placing a fuel cell on the mounting apparatus, and connecting a fuel line to the fuel cell and the fuel tanks.

In variations of this method, which may be implemented individually or in any combination: the fuel line is connected to an equalizing line disposed between the fuel tanks; a fitting attached to the equalizing line is replaced with a T-fitting; connecting the fuel line to the T-fitting; adjusting a height of the fuel cell to be approximately equal to a height of the fuel tanks on the trailer; moving the mounting apparatus from a retracted position to an expanded position; positioning the fuel cell at a longitudinal axis of the tractor; and connecting the mounting apparatus to tow pins secured to the tractor.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIGS. 6A to 6D show schematic side views of an auxiliary fueling system constructed in accordance with the teachings of the present disclosure, wherein

FIGS. 10A and 10B are schematic side views of a variant of an auxiliary fueling system constructed in accordance with the teachings of the present disclosure, wherein

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
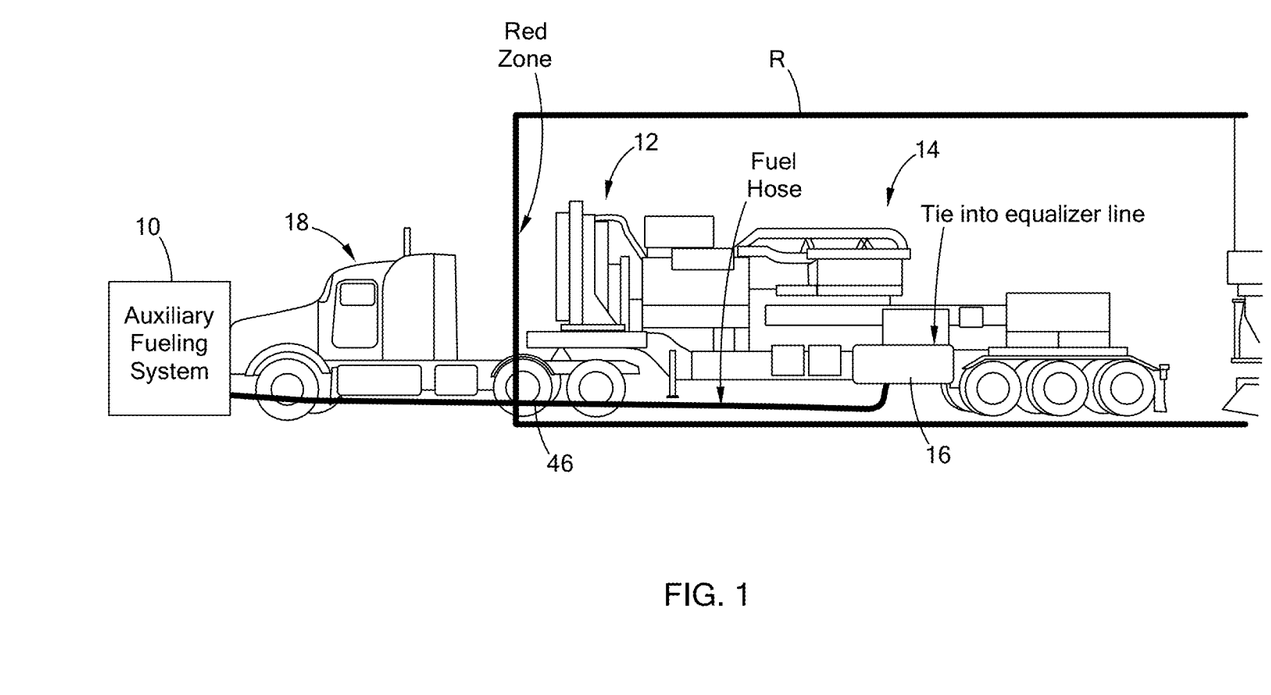
FIG. 1 is a schematic view of a tractor-trailer and an auxiliary fueling system for filling tanks disposed on the trailer and constructed in accordance with the teachings of the present disclosure.
Figure 2:
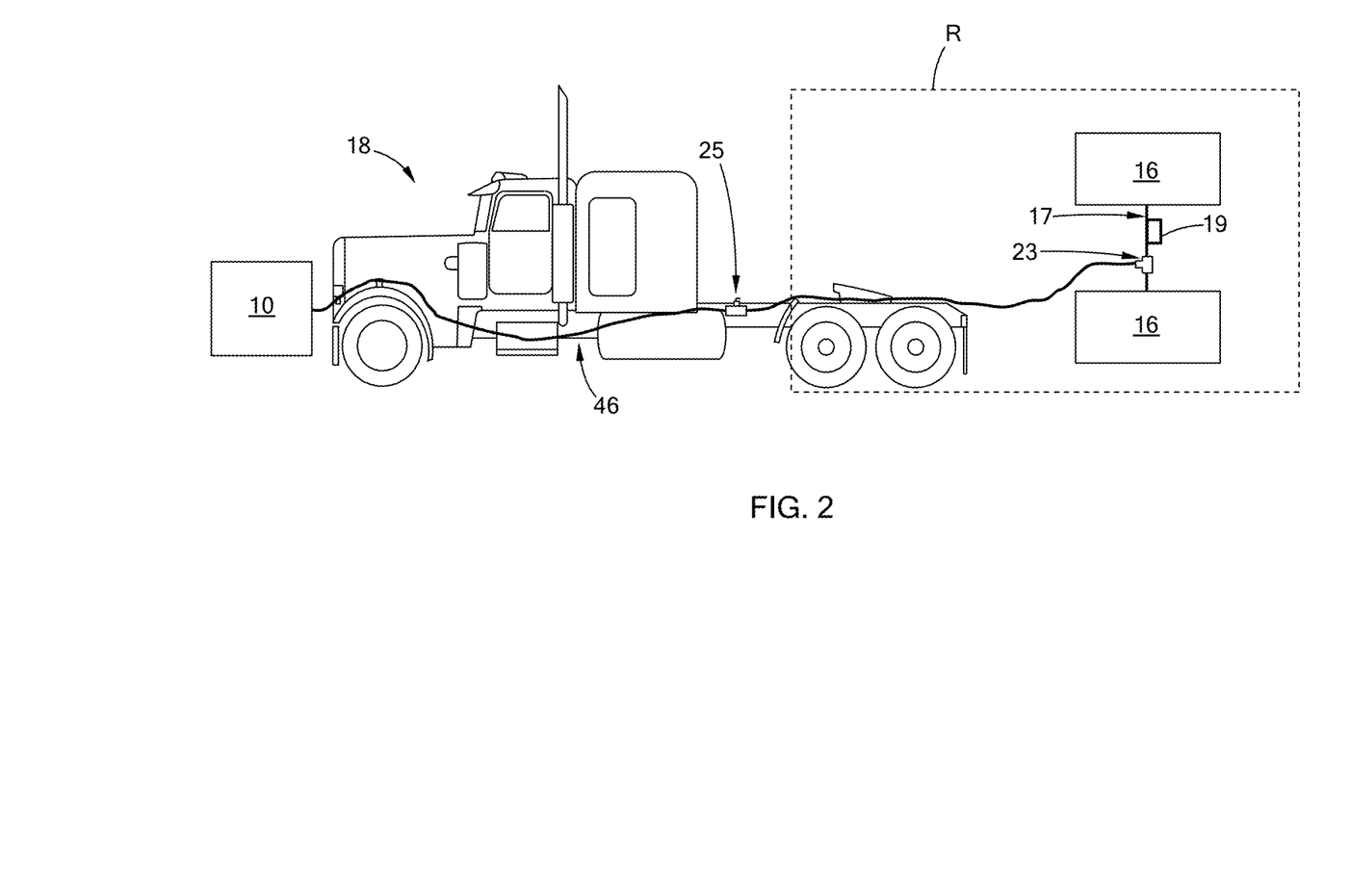
FIG. 2 is a view similar to FIG. 1, wherein the trailer is removed and the fuel tanks are schematically depicted to show the connection between the fuel tanks and the auxiliary fueling system.

Referring to FIGS. 1 and 2, an auxiliary fueling system 10 in accordance with the teachings of the present disclosure is constructed to fill a plurality of fuel tanks 16 disposed on a trailer 12 for fueling a power unit 14. The power unit 14 may include engines for driving one or more pumps (not shown) of a hydraulic fracturing system. The fuel tanks 16 (only one is shown in FIG. 1) supply fuel, such as diesel fuel, to the power unit 14. Both the power unit 14 and the fuel tanks 16 are disposed on the trailer 12. The fuel tanks 16 are connected by a fuel equalizing system, which includes an equalizing line 17 and an equalizing valve 19 (both shown in FIG. 2) for equalizing the pressure in the fuel tanks 16. The fuel tanks 16 may be connected to the auxiliary fueling system 10 via a fuel line 46, a T-fitting 23, and the equalizing line 17, which will be described in more detail below. The power unit 14, which includes multiple complex and powerful engines, may present hazards to personnel that are working near the power unit 14 when the power unit 14 is running.

A tractor 18 is hooked to the trailer 12 and functions also (in addition to transporting the trailer 12 and power unit 14) to support the auxiliary fueling system 10. As shown, the auxiliary fueling system 10 is mounted to the front of the tractor and is advantageously configured to fill the fuel tanks 16 disposed on the trailer 12 while the power unit 14 is still running without having an operator present proximate the power unit 14 and the fuel tanks 16. As shown, a Redzone "R" is an area that may present a hazard to personnel and starts just past the fuel tanks of the tractor 18 hooked and in front of the fifth wheel. While the power unit 14 is running, personnel are generally not permitted to be in the Redzone. With the auxiliary fueling system 10, the power unit 14 does not have to be shut down to fill the fuel tanks 16, which saves time and improves safety of the in-field operation, such as hydraulic fracturing.

Figure 3:
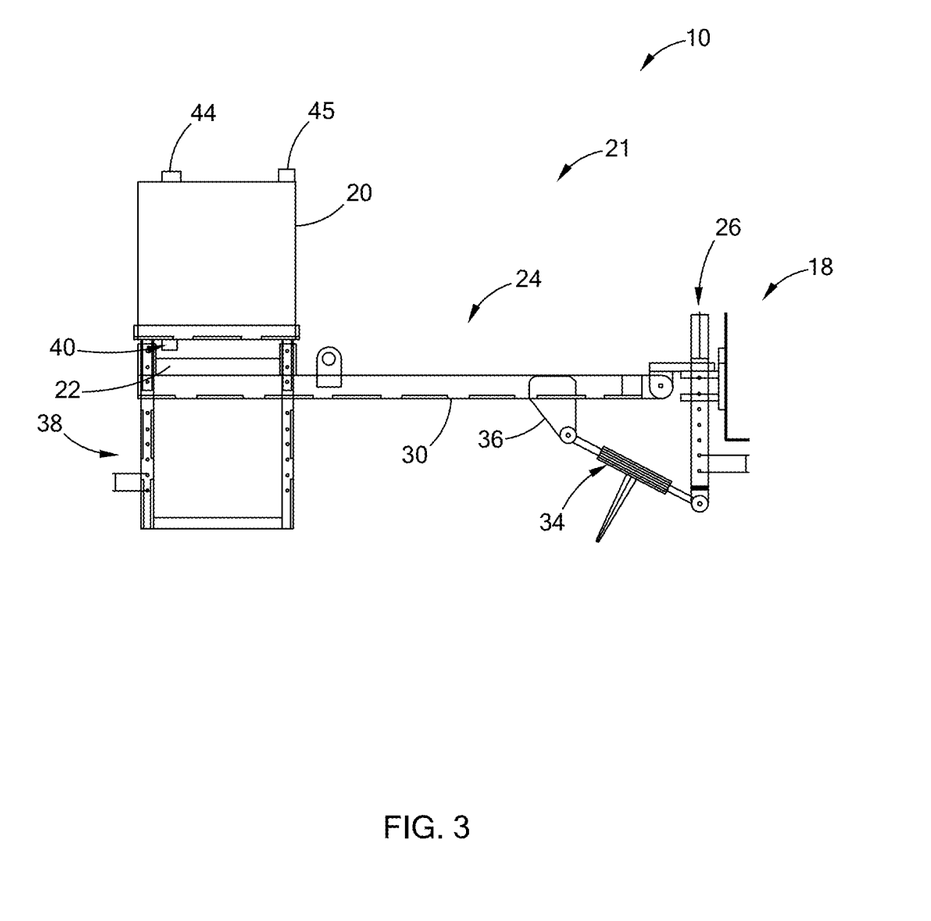
FIG. 3 is a schematic side view of an auxiliary fueling system constructed in accordance with the teachings of the present disclosure.

Referring to FIG. 3, the auxiliary fueling system 10 includes a fuel cell 20, and a mounting apparatus 21 mounted to the tractor 18 for supporting the fuel cell 20 thereon. The mounting apparatus 21 includes a frame 22 for supporting the fuel cell 20 thereon, and a connecting device 24 for connecting the frame 22 to a fastening device 26 secured to a front end of the tractor 18. The fastening device 26 may be in the form of tow pins, a front mount trailer hitch, a tractor drawbar, or any conventional structures that can be secured to the front end of the tractor 18 for connecting the mounting apparatus 21.

Although not shown, the fuel cell 20 may include internal baffles to limit movement/sloshing of fuel inside the fuel cell 20. As described in greater detail below, the present disclosure provides a plurality of ways in which to adjust the position of the auxiliary fueling system 10 within a Cartesian coordinate system, or in 3D space, both in translation and rotation.

Figure 4:
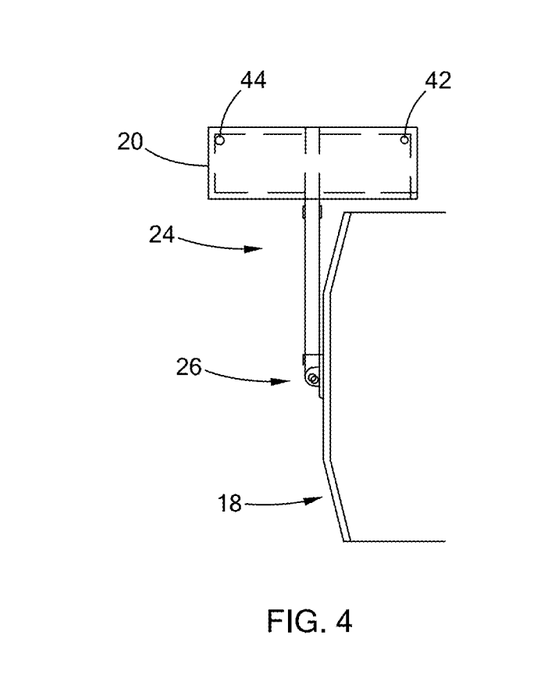
FIG. 4 is a schematic top view of the auxiliary fueling system of FIG. 3, wherein a mounting apparatus of the auxiliary fueling system is in a retracted position.
Figure 5:
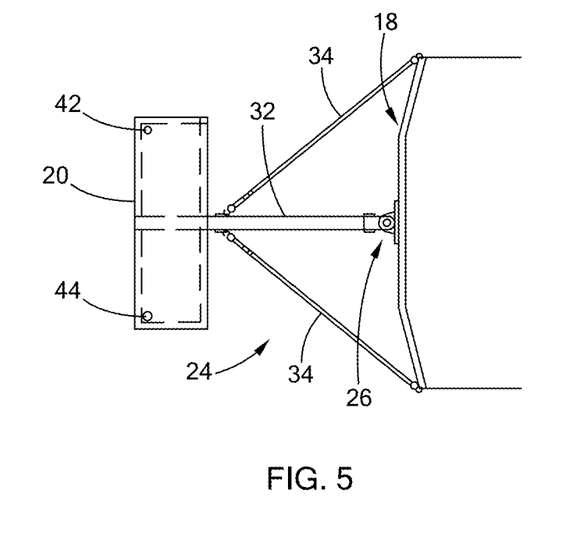
FIG. 5 is a schematic top view of the auxiliary fueling system of FIG. 3, wherein a mounting apparatus of the auxiliary fueling system is in an expanded position.

Referring to FIGS. 4 and 5, the connecting device 24 is pivotably mounted to the fastening device 26 secured to the tractor 18 and is pivotable between a retracted position (FIG. 4) and an expanded position (FIG. 5). The connecting device 24 includes a horizontal beam 32 secured to the frame 22 and pivotably connected to the fastening device 26, and a pair of side supports 34 connecting the horizontal beam 32 to lower side portions of the fastening device 26. The pair of side supports 34 maintain the horizontal beam 32 at a longitudinal axis of the tractor 18 when the connecting device 24 is in the expanded position. As an example, the side supports 34 may include a threaded pipe or a ratcheting mechanism such as a lever-type load binder or a ratchet chain binder. In this form, the side supports 34 are manually adjusted.

Referring back to FIG. 3, the side supports 34 may be connected to a flange 36 extending downwardly from the horizontal beam 30. The auxiliary fuel system 10 may further include a height adjusting device 38 for moving the fuel cell 20 up and down to adjust the height of the fuel cell 20 relative to the ground. In one form, the frame 22 and the height adjusting device 38 have sufficient strength to function as a ground stand to support the fuel cell 20 thereon. As such, after the fuel cell 20 is properly positioned, the frame 22 and the height adjusting device 38 may be detached from the tractor 18 so that the tractor 18 can go somewhere else.

The fuel cell 20 includes an outlet 40 at a bottom of the fuel cell 20, a fill port 42 (shown in FIGS. 4 and 5) at a top of the fuel cell 20 for filling the fuel cell 20, a gauge port 44 through which the fuel level can be measured, and a bleeder valve 45 to allow for release of air from the fuel cell 20. It should be understood that the positions of the fill port 42, the gauge port 44 and the bleeder valve 45 are merely exemplary and that these ports may be located anywhere on the fuel cell 20 while remaining within the scope of the present disclosure.

Referring to back to FIG. 2, the auxiliary fueling system 10 further includes a fuel line 46 having a first end connected to the outlet 40 (shown in FIG. 3) of the fuel cell 20 and a second end connected to the equalizing line 17 that is disposed between the fuel tanks 16. A quick connect, such as a T-fitting 23, may be used for connecting the fuel line 46 to the equalizing line. To connect the fuel line 46 to the equalizing line 17, a fitting that is attached to the equalizing line may be replaced with the T-fitting 23, followed by connecting the fuel line 46 to the T-fitting 23. The fuel line 46 may be maintained at a height from the ground such that the personnel will not trip over the fuel line 46. The fuel line 46 may include a shut-off valve 25 for controlling the flow of the fuel from the fuel cell 20 to the fuel tanks 16.

Referring to FIGS. 6A to 6D, the height adjusting device 38 is provided at a bottom of the fuel cell 20 for adjusting the height of the fuel cell 20 relative to the ground. To guide the fuel to flow from the fuel cell 20 to the fuel tanks 16 on the trailer 12, it is preferable that the fuel cell 20 is positioned at approximately the same height of the fuel tanks 16.

Figure 6A:
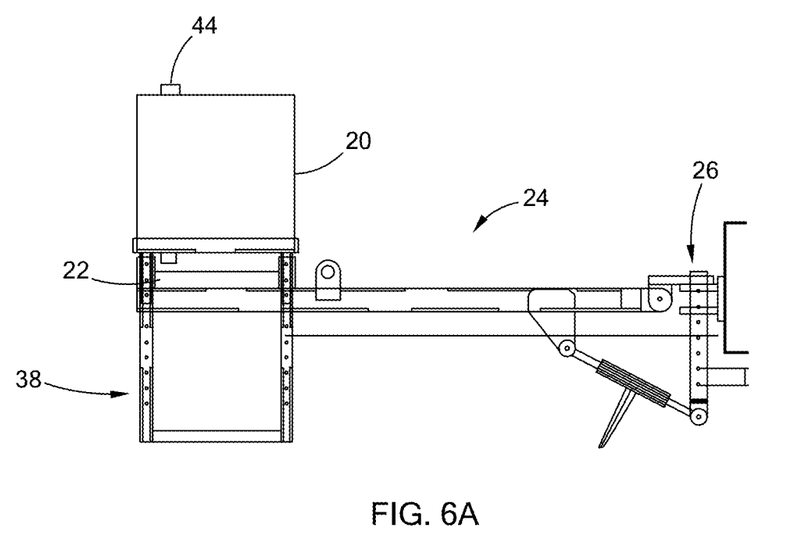
FIG. 6A shows a height adjusting device is mounted to a bottom of the fuel cell.
Figure 6B:
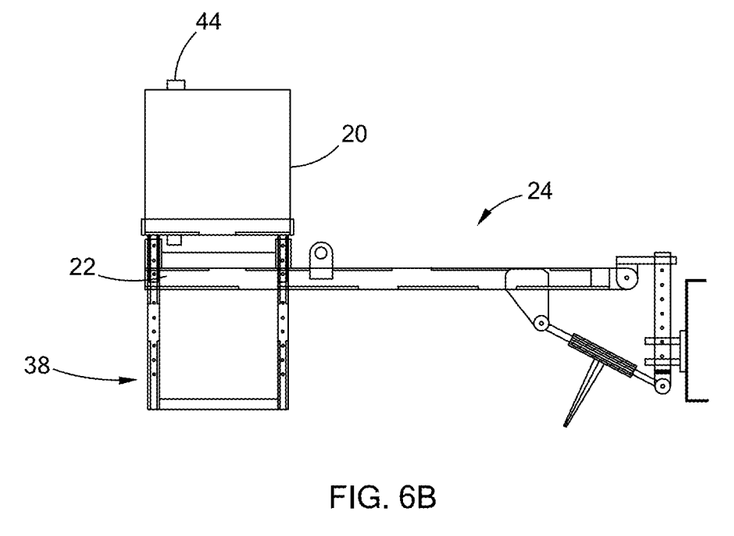
FIG. 6B shows the height adjusting device moves the fuel cell upward to a first height by moving the height adjusting device upward.
Figure 6C:
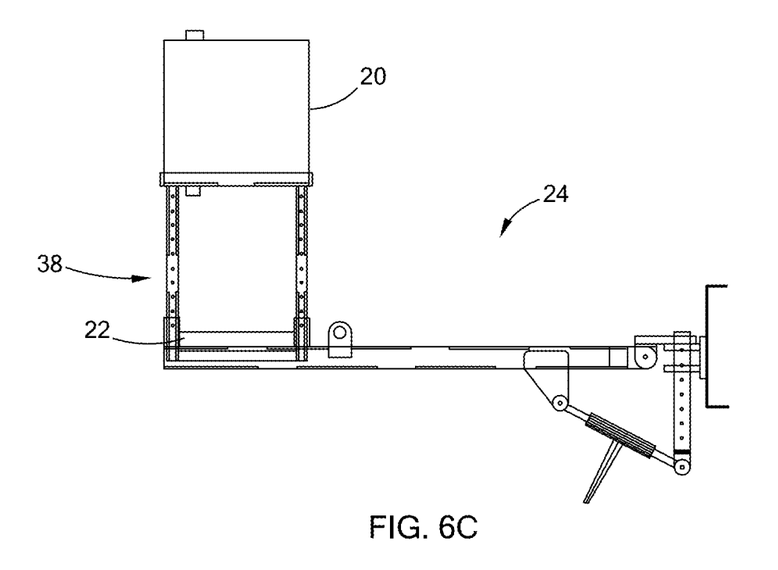
FIG. 6C shows the height adjusting device moves the fuel cell to a second height by further moving the height adjusting device upward.
Figure 6D:
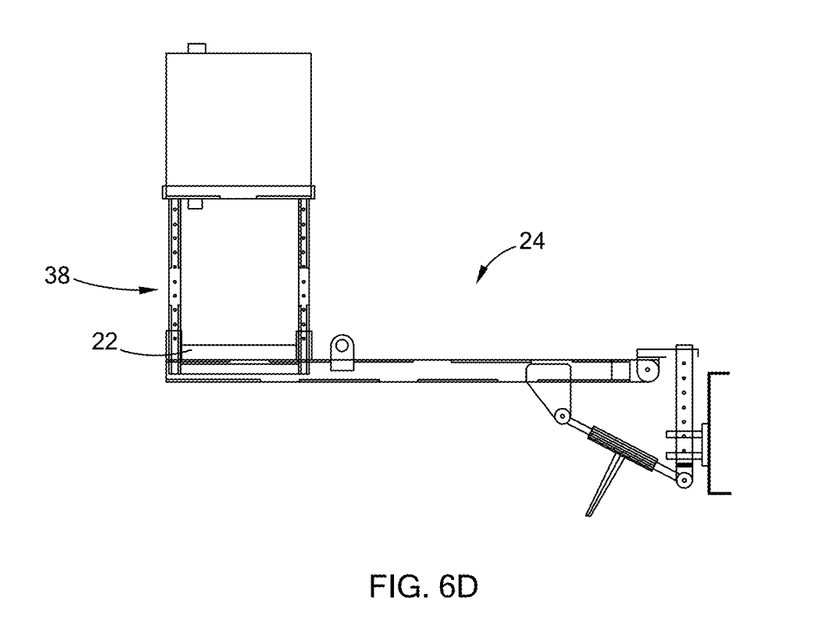
FIG. 6D shows the fuel cell is moved further upward by changing a height of the height adjusting device.

FIG. 6A shows the height adjusting device 38 is mounted to a bottom of the fuel cell 20 and supported by the frame 22 of the mounting apparatus 21. FIG. 6B shows the height adjusting device 38 moves the fuel cell 20 upward to a first height by moving the height adjusting device 38 upward. FIG. 6C shows the height adjusting device 38 moves the fuel cell 20 to a second height by further moving the height adjusting device 38 upward. In this state, most parts of the height adjusting device 38 are disposed above the frame 22. FIG. 6D shows the fuel cell 20 can be moved further upward by changing a dimension (i.e., the height) of the height adjusting device 38.

Figure 7:
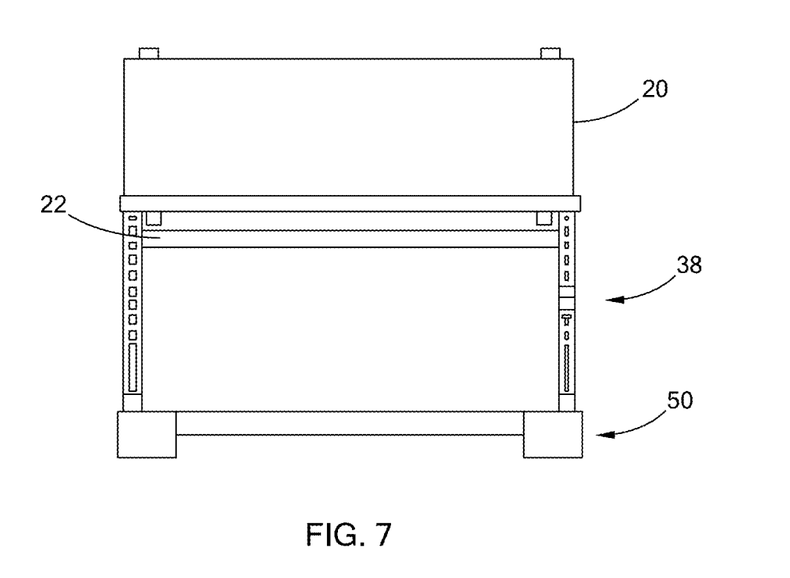
FIG. 7 is a schematic front view of an auxiliary fueling system constructed in accordance with the teachings of the present disclosure, wherein a height adjusting device is connected to and moved by a forklift stand.
Figure 8:
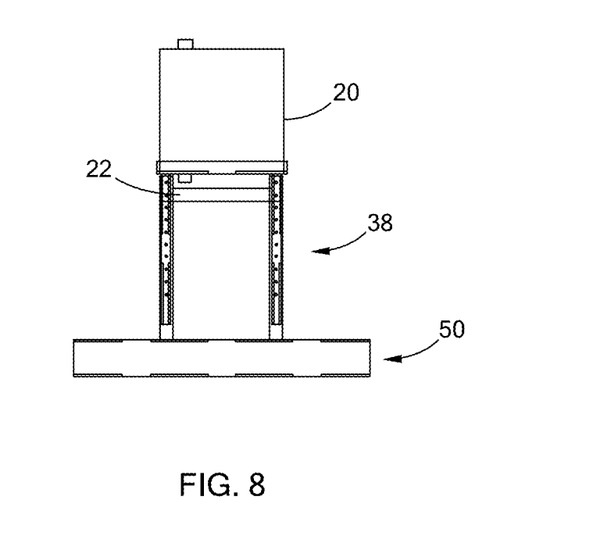
FIG. 8 is a schematic side view of an auxiliary fueling system of FIG. 7, wherein the fuel cell is moved to a first height.
Figure 9:
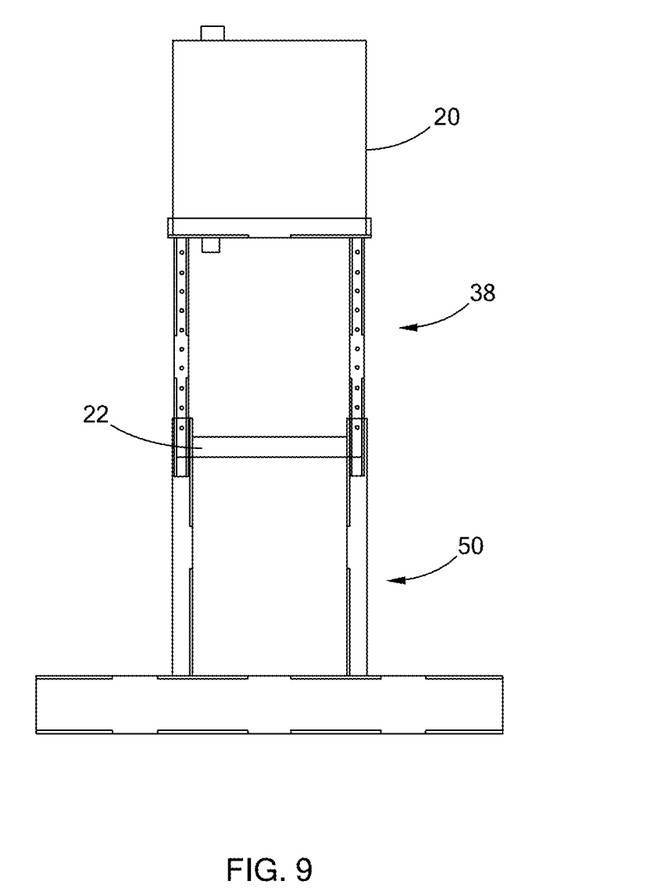
FIG. 9 is a schematic side view of an auxiliary fueling system of FIG. 7, wherein the fuel cell is moved to a second height.

Referring to FIGS. 7 to 9, instead of using the frame 22 to support the height adjusting device 38, a forklift stand 50 may be disposed at a bottom of the height adjusting device 38 to support and move the height adjusting device 38. As shown in FIG. 8, the fuel cell 20 is moved to a first height by the forklift stand 50. As shown in FIG. 9, the fuel cell 20 is moved to a second height by using the forklift stand 50 to move the height adjusting device 38 upward.

Figure 10A:
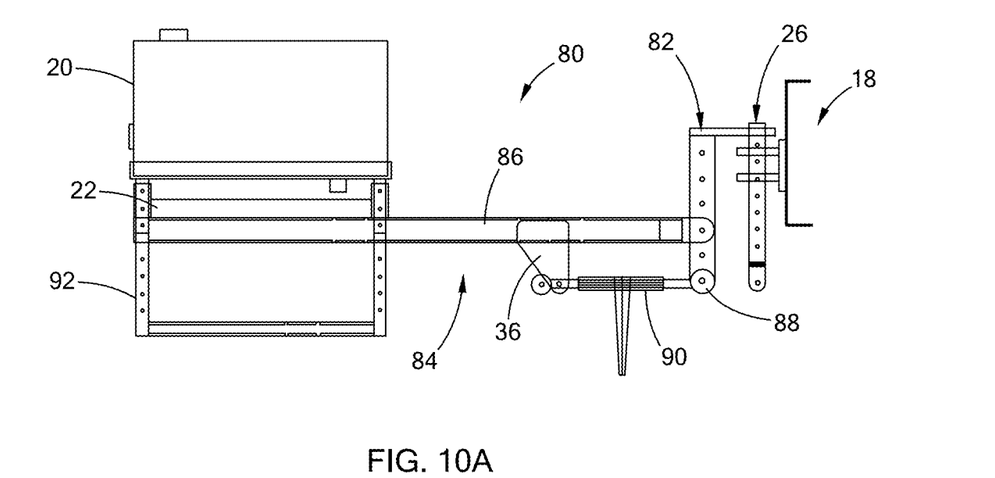
FIG. 10A shows the fuel cell is supported at a first height.
Figure 10B:
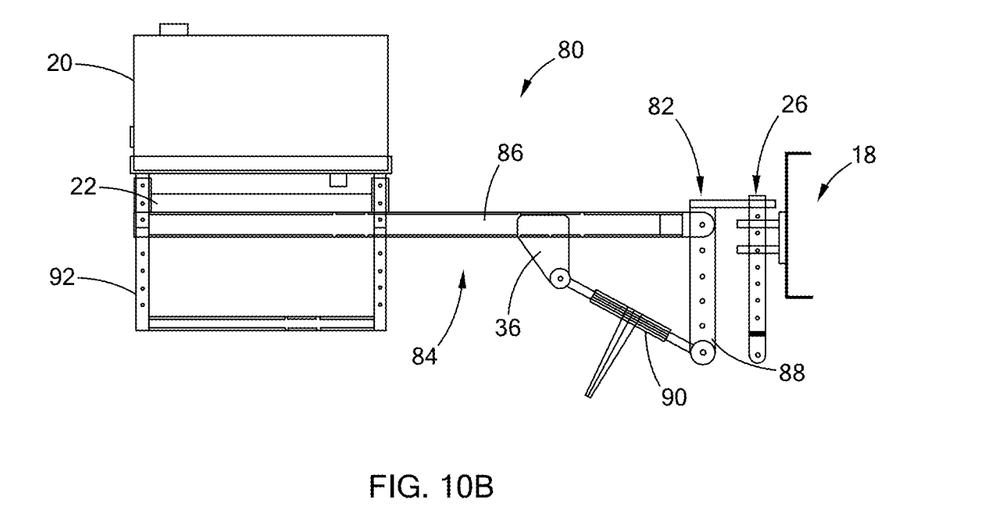
FIG. 10B shows the fuel cell is moved upward to a second height.

Referring to FIGS. 10A and 10B, a variant of a mounting apparatus 80 for mounting and supporting the fuel cell 20 to the front end of the tractor 18 is shown. The mounting apparatus 80 is structurally similar to the mounting apparatus 21 shown in FIG. 3 except that the mounting apparatus 80 includes a height adjusting device proximate the front end of the tractor 18. Therefore, like elements will be designated by like reference numerals and the detailed description thereof will be omitted herein for clarity.

More specifically, the mounting apparatus 80 includes a frame 22 for supporting the fuel cell 20 thereon, a height adjusting device 82 connected to the fastening device 26 secured to the front end of the tractor 18, and a connecting device 84 for connecting the frame 22 to the height adjusting device 82. The connecting device 84 is structurally similar to that of the connecting device 24 of FIG. 3 and includes a horizontal beam 86 and a flange 36 extending downwardly from the horizontal beam 86. The horizontal beam 86 includes opposing first and second ends. The first end of the horizontal beam 86 is disposed under the frame 22 and the fuel cell 20 to support the frame 22 and the fuel cell 20 thereon. The second end of the horizontal beam 86 is connected to the height adjusting device 82. The height adjusting device 82 may include a vertical member 88 vertical to the horizontal beam 86. The second end of the horizontal beam 86 may be selectively connected one of a plurality of positions along the length of the vertical member 88 so that the horizontal beam 86 and the frame 22 may be positioned at different heights.

Like the connecting device 24 of FIG. 3, the connecting device 84 includes a pair of side supports 90 connected to the flange 36 extending from the horizontal beam 86 to provide further support for the horizontal beam 86 in the horizontal position. However, the pair of side supports 90 are also connected to a lower end of the vertical member 88. With the height adjusting device 82, the height adjusting device 38 disposed under the frame 22 as shown in FIG. 3 may be eliminated or may be replaced with a ground stand 92.

Figure 11:
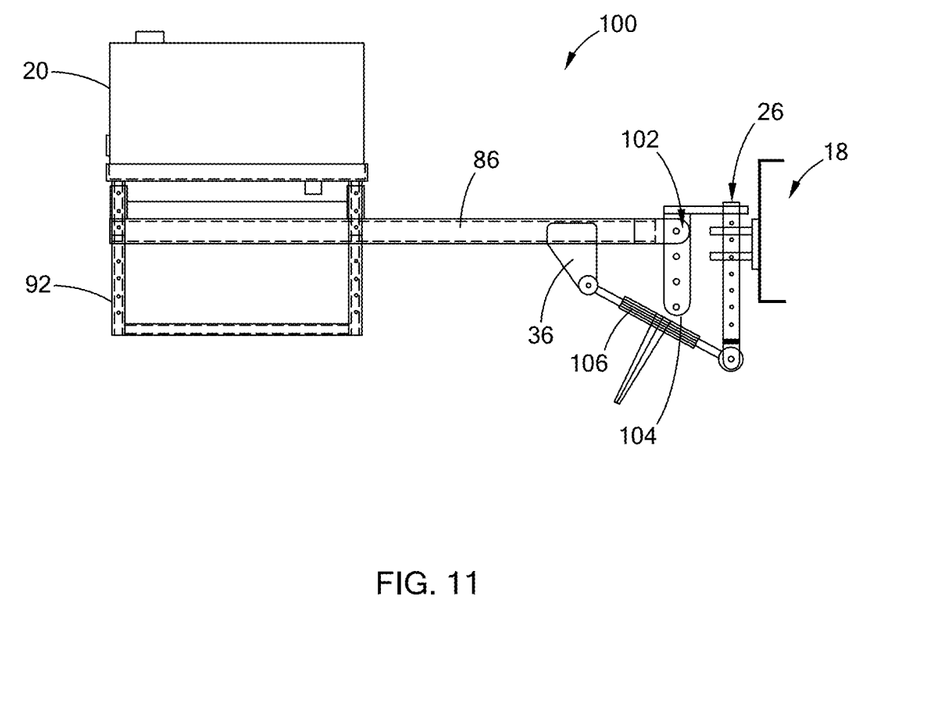
FIG. 11 is a schematic side view of another variant of an auxiliary fueling system constructed in accordance with the teachings of the present disclosure.

Referring to FIG. 11, another variant of a mounting apparatus 100 for mounting and supporting the fuel cell 20 to the front end of the tractor 18 is shown. The mounting apparatus 100 is structurally similar to the mounting apparatus 80 of FIGS. 10A and 10B except that the mounting apparatus 100 includes a height adjusting device 102 having a vertical member 104 shorter than the vertical member 88.

Therefore, the pair of side supports 106 can be connected to lower ends of the fastening device 26 secured to the front end of the tractor 18.

Referring back to FIG. 2, after the fuel line 46 is connected between the fuel cell 20 and the equalizing line 17 and after the height of the fuel cell 20 is adjusted, air may be removed from the equalizing line 17 and the fuel line 46 by using a bleeder valve 45 (shown in FIG. 3) disposed on the fuel cell 20 to equalize the pressure between the fuel tanks 16 and the fuel cell 20. After this equalizing process, the auxiliary fueling system 10 can start filling fuel in the fuel tanks 16.

Figure 12:
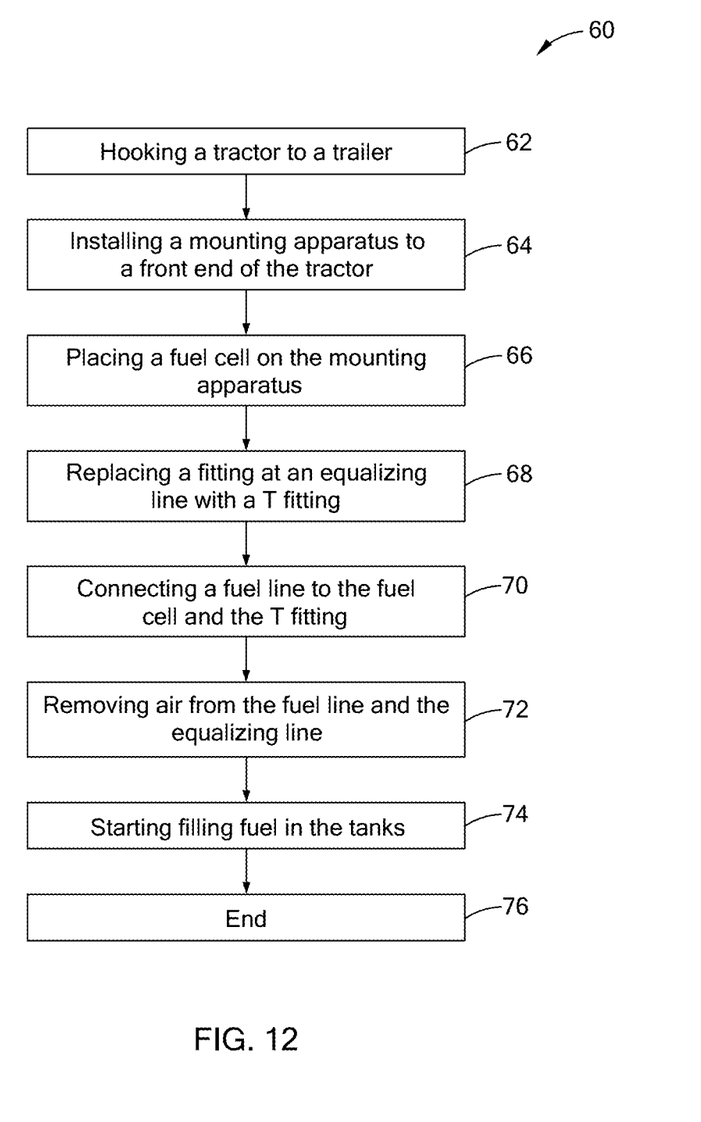
FIG. 12 is a flow chart of a method of filling fuel tanks disposed on a trailer in accordance with the teachings of the present disclosure.

Referring to FIG. 10, a method 60 of filling fuel tanks 16 disposed on a trailer 12 starts with hooking a tractor 18 to the trailer 12 in step 62. Next, a mounting apparatus 21 is installed to a front end of the tractor 18 in step 64. A fuel cell 20 is placed on a frame 22 of the mounting apparatus 21 in step 66. A T-fitting 23 is used to replace a fitting at an equalizing line 17 that connects the fuel tanks in step 68. The T-fitting 23 may be a dry lock quick connect to facilitate attaching and removing the T-fitting 23 to and from the equalizing line 17. The angle of the T-fitting 23 may be adjusted, such as 90 degrees, to facilitate connecting the fuel line 46 to the T-fitting 23. Thereafter, the fuel line 46 is connected to the T-fitting 23 and an outlet 40 of the fuel cell 20 in step 70. After the fuel line 46 is connected, air is removed from the equalizing line 17 and the fuel line 46 through a bleeder valve 45 in step 72. Optionally, a fuel cap may be replaced with a level sensor. The level sensor helps determining the fuel level in the fuel cell 20 during the fueling process. Alternately, a stick may be used to determine the fuel level in the fuel cell 20.

After the equalizing process, the auxiliary fueling system 10 may start filling fuel in the fuel tanks 16 in step 74. The fueling process may be performed several times as needed during the hydraulic fracturing process until the hydraulic fracturing process is completed. The method ends in step 76.

The auxiliary fueling system of the present disclosure provides a safe fueling operation while a power unit that is disposed on the trailer is still running. No operator needs to be present in the Redzone R during the fueling process.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An auxiliary fueling system for filling fuel tanks disposed on a trailer, the auxiliary fueling system comprising:
   a fuel cell;
   a mounting apparatus mounted to a tractor hooked to the trailer for supporting the fuel cell thereon; and a fuel line for connecting the fuel cell to the fuel tanks on the trailer.

2. The auxiliary fueling system according to claim 1, wherein the fuel line is connected to an equalizing line disposed between the fuel tanks.

3. The auxiliary fueling system according to claim 2, further comprising a quick connect for connecting the fuel line to the equalizing line.

4. The auxiliary fueling system according to claim 3, wherein the quick connect is a T-fitting.

5. The auxiliary fueling system according to claim 1, wherein the mounting apparatus comprises a frame for supporting the fuel cell thereon, and a connecting device for connecting the frame to the tractor.

6. The auxiliary fueling system according to claim 5, wherein the connecting device is pivotable between a retracted state and an expanded state.

7. The auxiliary fueling system according to claim 5, wherein the connecting device includes a horizontal beam and a side support disposed at each side of the horizontal beam.

8. The auxiliary fueling system according to claim 7, wherein the side supports maintain the horizontal beam to extend along a longitudinal axis of the tractor when the connecting device is in an expanded state.

9. The auxiliary fueling system according to claim 7, wherein the connecting device further includes a flange extending from the horizontal beam, the side supports being connected to the flange.

10. The auxiliary fueling system according to claim 1, wherein the mounting apparatus is connected to tow pins secured to a front end of the tractor.

11. The auxiliary fueling system according to claim 1, further comprising a height adjusting means for adjusting a height of the fuel cell.

12. The auxiliary fueling system according to claim 11, wherein the height adjusting means is a forklift stand.

13. A method of filling fuel tanks disposed on a trailer, the method comprising:
hooking a tractor to the trailer;
attaching a mounting apparatus to the tractor;
placing a fuel cell on the mounting apparatus; and
connecting a fuel line to the fuel cell and the fuel tanks.

14. The method according to claim 13, further comprising connecting the fuel line to an equalizing line disposed between the fuel tanks.

15. The method according to claim 14, further comprising replacing a fitting attached to the equalizing line with a T-fitting.

16. The method according to claim 15, further comprising connecting the fuel line to the T-fitting.

17. The method according to claim 13, further comprising adjusting a height of the fuel cell to be approximately equal to a height of the fuel tanks on the trailer.

18. The method according to claim 13, further comprising moving the mounting apparatus from a retracted position to an expanded position.

19. The method according to claim 13, further comprising positioning the fuel cell at a longitudinal axis of the tractor.

20. The method according to claim 13, further comprising connecting the mounting apparatus to tow pins secured to the tractor.

* * * * *